United States Patent [19]
Simens

[11] 3,800,692
[45] Apr. 2, 1974

[54] APPARATUS FOR FRYING CHICKEN

[76] Inventor: Robert R. Simens, 296 E. 271st St., Euclid, Ohio 44132

[22] Filed: Jan. 14, 1972

[21] Appl. No.: 217,789

[52] U.S. Cl............ 99/332, 99/107, 99/343, 99/403, 99/408, 99/448
[51] Int. Cl............ A47j 27/14
[58] Field of Search ...... 220/55 PC; 99/343, 408, 99/416, 417, 410, 332, 403, 107

[56] References Cited
UNITED STATES PATENTS

| | | |
|---|---|---|
| 1,460,975 | 7/1923 | Miller et al. .......... 99/410 |
| 2,086,475 | 7/1937 | Powell .......... 99/403 |
| 2,532,639 | 12/1950 | Payne .......... 99/403 |
| 2,840,436 | 6/1958 | Mason .......... 99/403 X |
| 3,210,193 | 10/1965 | Martin .......... 99/403 X |
| 3,245,800 | 4/1966 | Sanders .......... 99/107 |
| 3,463,078 | 8/1969 | Pirtle .......... 99/403 |
| 3,613,550 | 10/1971 | Thompson .......... 99/408 X |

*Primary Examiner*—Billy J. Wilhite

[57] ABSTRACT

An improved cooking system is provided for small restaurants which requires a relatively low investment in equipment and which makes possible a drastic increase in frying capacity for a given number of burner units. Novel double-pot pressure cookers are employed which include a unique pot-extension or collar having an upper lid-receiving portion corresponding to the upper portion of the pot of a conventional pressure cooker and a lower portion corresponding to the marginal portion of the lid of a conventional pressure cooker. The novel process includes apparatus to empty the lower pots rapidly, to filter the hot fat or shortening, and to return the filtered fat to the pots.

9 Claims, 12 Drawing Figures

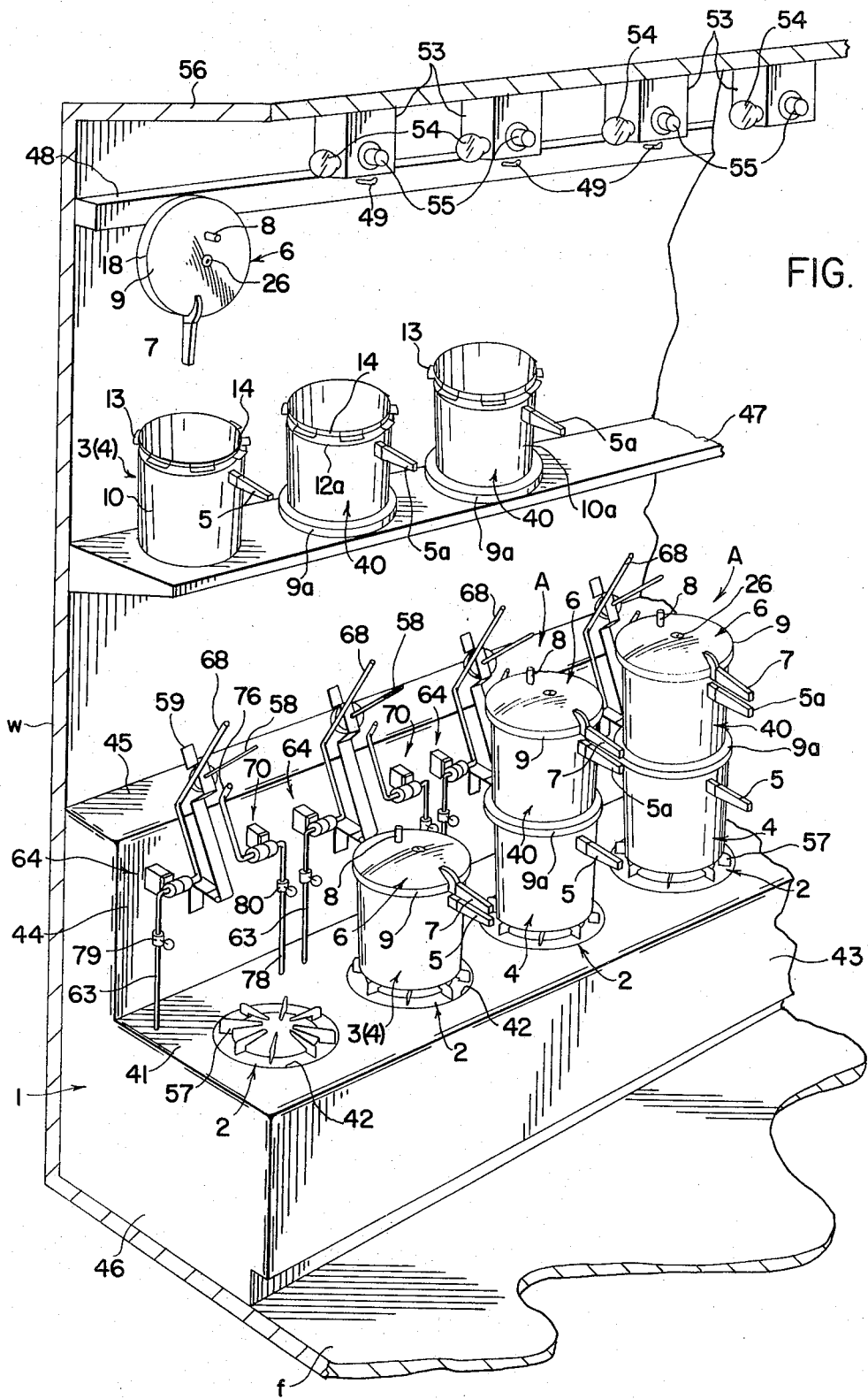
FIG. I

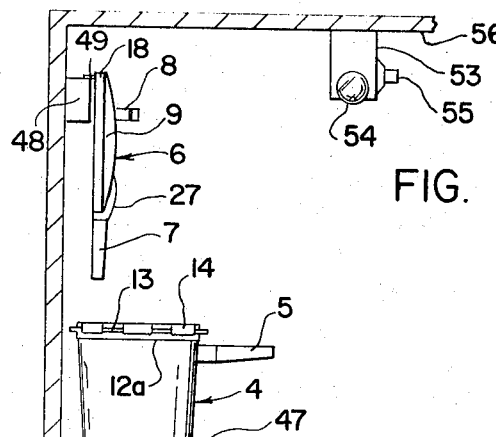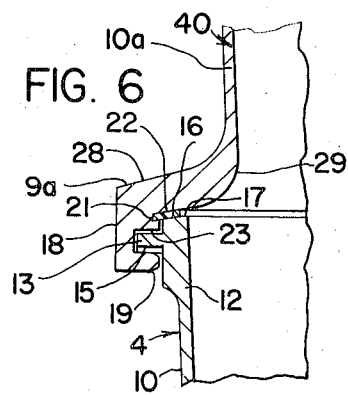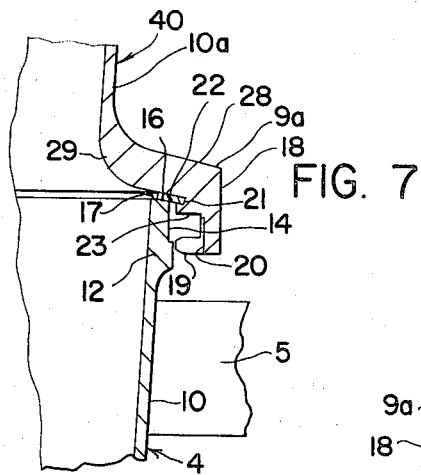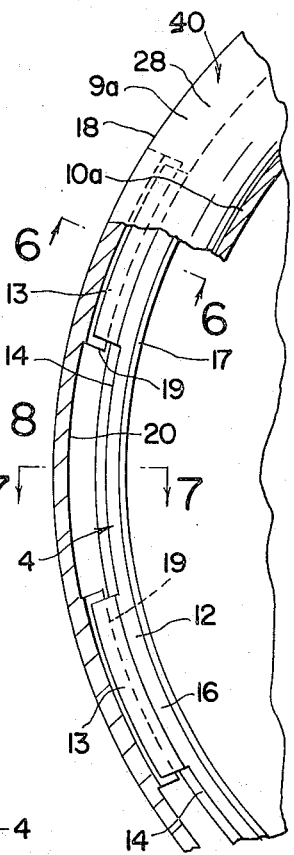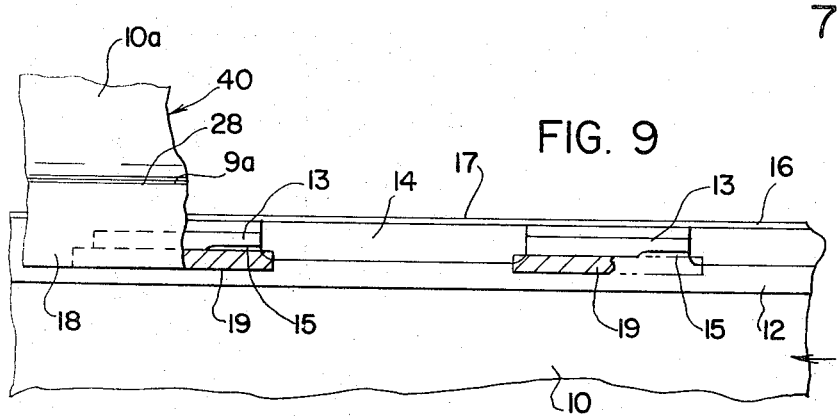

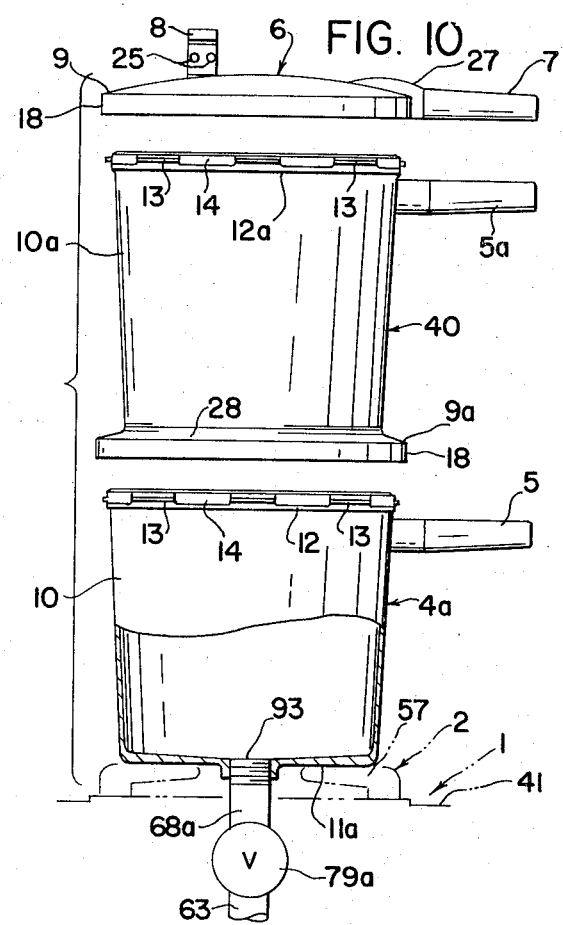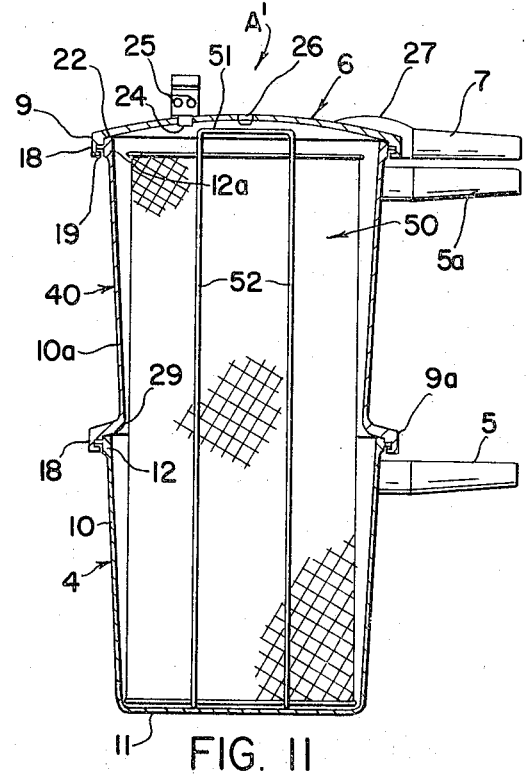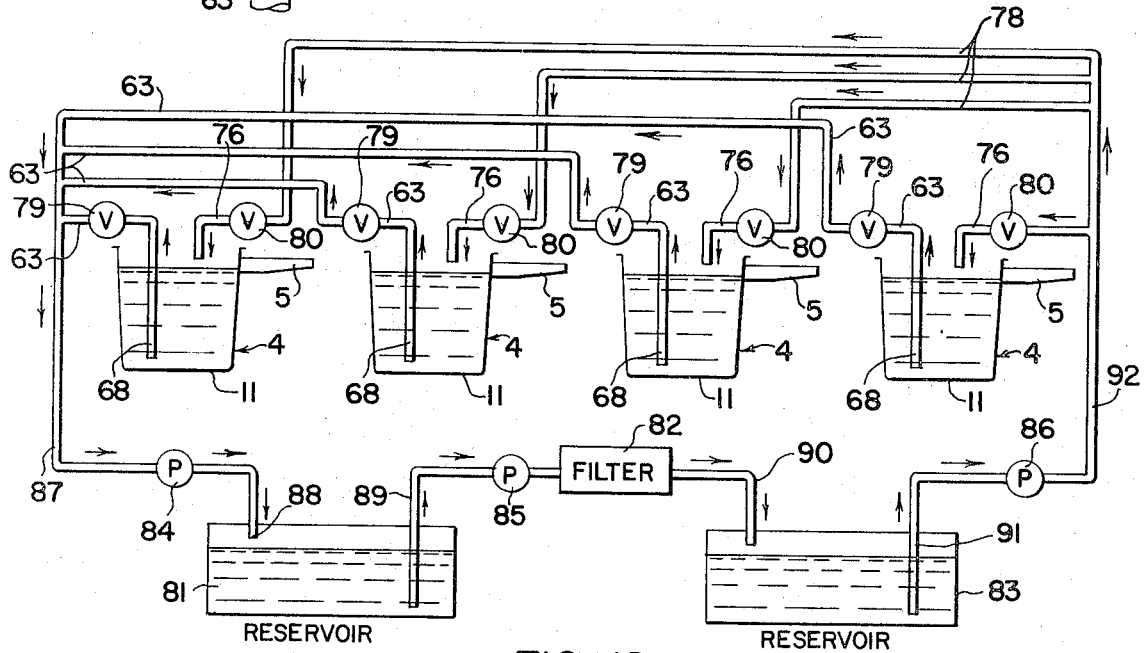
FIG. 10
FIG. 11
FIG. 12

APPARATUS FOR FRYING CHICKEN

The present invention relates to an apparatus for frying chicken and more particularly to a frying apparatus employing a unique two-section pressure cooker.

Heretofore, small restaurants have cooked fried chicken and other food in conventional pressure cookers comprising a pot having a removable lid and suitable valve means to provide a substantial pressure, such as 5 to 15 pounds per square inch. For example, it is common for a small restaurant specializing in fried chicken to utilize 5 to 10 of such pressure cookers rather than to invest large sums of money in large commercial frying machines.

In order to obtain the desired taste, it is necessary to empty and clean the pot after cooking each batch and to filter the cooking oil or fat. In this process it is not practical to employ a large pot (for example, with a capacity greater than 30 quarts) because of the difficulty in manipulating it and the danger in handling high temperature fat.

The cooking capacity of small restaurants using pressure cookers as described above has necessarily been limited with the result that it was often difficult to meet the demand in the rush periods. Attempts to meet the demand by cooking in advance of the anticipated peak period resulted in less palatable chicken and additional expense for heated storage cabinets or the like. However, although this was not a satisfactory solution to the problem, it was often considered better than enlarging the kitchen and increasing the number of burners and pressure cookers, particularly when the capacity of the existing kitchen was adequate for average conditions.

The present invention solves the above problem by providing an apparatus for cooking the chicken wherein the pot of the pressure cooker comprises upper and lower sections, the lower section being a conventional pot and the upper section being a generally cylindrical extension similar to the lower section but open at both ends and having a bottom marginal flange portion adapted to fit the lower section like the conventional lid. Means are provided at each burner or heating element of the heating range or stove to facilitate removal of the hot fat from the lower pot at the end of each cooking cycle, and conventional means are provided for filtering the fat before it is reused.

The invention makes it possible to double the peak capacity of a restaurant at nominal cost without increasing the number of burners in the kitchen area or substantially increasing its size. The unique upper section of the pressure cooker is, of course, optional and can be omitted during slack periods.

An object of the present invention is to provide an effective inexpensive apparatus for cooking chicken which requires a relatively small investment in equipment and kitchen facilities.

Another object of the invention is to reduce the cost of preparation of fried foods by relatively small restaurants.

A still further object is to provide a means for doubling the capacity of existing restaurants that employ pressure cookers for frying chicken.

Another object is to provide means for increasing the cooking capacity of a restaurant during peak periods.

Another object is to minimize the need for storage of precooked food in a restaurant employing pressure cookers.

These and other objects, uses and advantages of the invention will become apparent to those skilled in the art from the following drawings, description and claims.

In the drawings:

FIG. 1 is a fragmentary perspective view on a reduced scale showing the apparatus of the present invention;

FIG. 2 is a side elevational view of the apparatus of FIG. 1;

FIG. 6 is a fragmentary vertical sectional view showing portions of the double pot;

FIG. 7 is another fragmentary vertical sectional view similar to FIG. 6 but taken at a different location;

FIG. 8 is a fragmentary horizontal sectional view of the double pot with parts broken away and shown in section;

FIG. 9 is a fragmentary side elevational view with parts broken away and shown in section;

FIG. 10 is an exploded view of a modified form of double pot on a reduced scale;

FIG. 11 is a vertical sectional view of a double pot showing a preferred form of wire basket therein; and FIG. 12 is a diagrammatic view of one form of fluid control system which may be employed with the apparatus of FIGS. 1 and 2.

Figure 3:
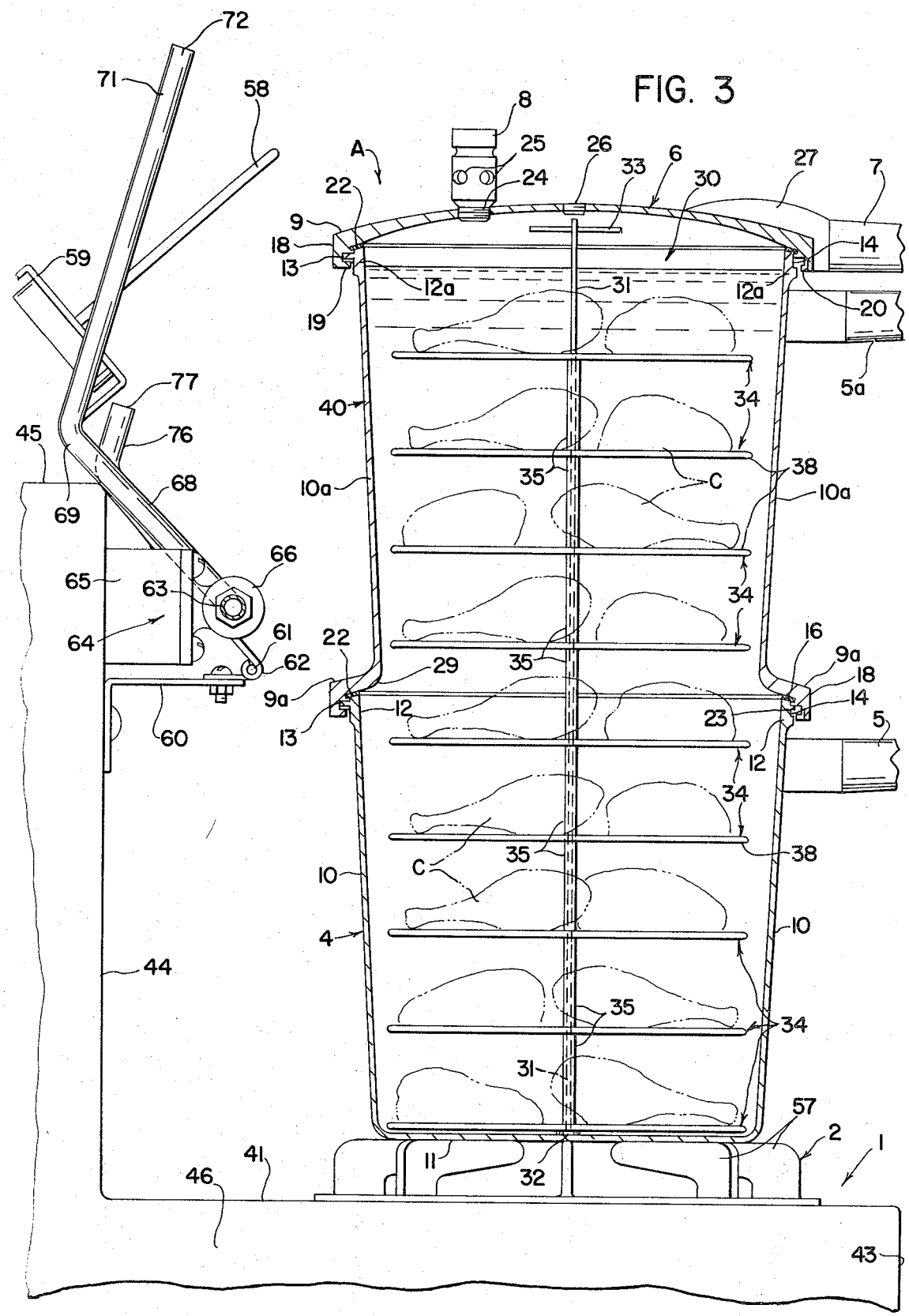
FIG. 3 is a fragmentary side elevational view of the apparatus of FIGS. 1 and 2 shown in vertical cross section above the burner unit a double-pot pressure cooker constructed according to the present invention.

The drawings are drawn substantially to scale to facilitate an understanding of the invention, and like parts are identified by the same numerals throughout the several views, in some instances with suffix letters added. It will be understood, however, that the size and shape of the parts of the equipment shown herein may vary considerably.

Referring more particularly to the drawings, FIGS. 1 and 2 show kitchen equipment constructed according to the present invention and having a conventional gas burner range 1 with a row of 4 to 20 and preferably 5 to 10 conventional burner units 2. As shown, the first burner unit 2 is empty, the second burner unit 2 supports a stainless-steel pressure cooker 3, and the next two burner units support the unique double-pot assemblies A of this invention.

The pressure cooker 3 is conventional and may be a standard 16-quart or 21-quart "Presto" stainless-steel pressure cooker with a special valve 8 on the lid for quick pressure release. The pot 4 of the pressure cooker has a conventional plastic handle 5, and the lid 6 has a conventional plastic handle 7, which may be aligned with the handle 5 when the lid is locked in the closed position. The handle 7 may have a decorative metal attaching portion 27.

The pot 4 of the pressure cooker 3 is conventional and has a slightly tapered side wall portion 10 of circular cross section and generally uniform thickness terminating in a flat circular bottom wall portion 11. The upper marginal portion 12 of the pot is thickened and may be originally formed of uniform cross section throughout its periphery. It is cut away to provide eight radially projecting marginal flanges 13 and eidht cut-away surfaces 14 between the flanges. Each flange 13 extends 20 degrees or so around the circumference, and each surface 14 preferably extends a somewhat greater distance, such as 25 degrees. Each flange 13 preferably has a conventional cut-away surface 15 on its lower side to facilitate assembly and to permit safe loosening of the lid.

The top surface of the side wall 10 may be generally flat. As shown in FIGS. 7 and 8, it has a narrow flat portion 17 and a wider gasket-engaging surface portion 16 which is tapered or generally conical.

The lid 6 of the pressure cooker 3 is of conventional construction and has a thickened marginal portion 9 with an externally cylindrical flange portion 18 that extends downwardly below the flanges 13 of the pot 4. The portion 18 may be originally formed of uniform cross section throughout its periphery and then machined to provide eight radially inwardly projecting flanges 10 and eight cut-away surfaces 20 between said flanges, whereby the lid can readily be dropped into engagement with the upper surface 16 of the pot when the flanges 19 of the lid are in alignment with the cut-away surfaces 14 of the pot. As shown herein, each flange 19 extends about 20° and each cut-away portion 20 extends about 25°.

The construction of the lid 6 is shown in FIG. 3, and the details of the marginal portion 9 shown in that figure are best understood by reference to FIGS. 6 and 7, wherein the flange 18 of the marginal portion 9a is identical to the flange 18 of portion 9. As shown, there is provided a marginal slot 21 of a size to receive a circular gasket of rectangular cross section, which is formed of a suitable heat-resistant rubber. There is also provided a flat horizontal circumferential surface 23 opposite and parallel to the flanges 19 and spaced therefrom a distance such that the flanges 13 of the pot can be turned relative to the lid when they project between the surface 23 and the flange (see FIG. 6).

The conventional pressure cooker 3 is assembled by positioning the lid handle 7 about 20° to 25° out of alignment with the pot handle 5 so that the flanges 19 of the lid move downwardly between the flanges 13 of the pot and the rubber gasket engages the tapered upper surface 16 of the pot. The handle can then be easily turned 5 to 10 degrees to slide each lid flange 19 over the surface 15 at the narrow end of the pot flange 13 (see FIG. 9). Continued turning of the handles in the same direction compresses the gasket 22 and positions the flanges 19 in alignment with the flanges 13 and in face-to-face clamping engagement (see FIGS. 8 and 9). At this time the handles 5 and 7 are in alignment, and the flat upper surface of each lid flange 19 engages the flat lower surface of the associated pot flange 13 to maintain the gasket 22 in sealing engagement with the top surface 16 of the pot throughout its circumference, thereby preventing the escape of liquid or gas from the pot.

During cooking or frying, the pressure may be maintained between 5 and 15 pounds per square inch above atmospheric pressure. When the cooking is completed, the gas pressure is released by opening the valve 8 or other suitable pressure release valve, and the handles 5 and 7 are moved apart 20° or so to permit removal of the lid from the pot. Note that the flanges 19 move against the surface 15 to relieve the pressure on the gasket 22 before the flanges 13 and 19 are disengaged. This avoids any possibility of blowing off the lid if any gas pressure remains in the pot when the lid is being removed and also helps to avoid spilling when a high force is required to start turning of the handles.

One or more valves may be provided in the lid 6, such as control valves, vent valves or pressure relif valves to control the pressure, prevent excessive pressure or relieve the pressure at the end of the cycle. A special valve 8 may be provided as shown in FIG. 3 having a threaded lower end portion 24 screwed into the lid and four regularly spaced radial gas ports 25. The valve 8 is conventional and is designed for rapid release of gas pressure at the end of the cycle. A conventional blow-off valve 26 may also be provided at the center of the lid.

The upper cylindrical portion of valve 8 is a metal weight which is lifted by the gases flowing out of the gas ports 25. The weight of this cylindrical member determines the pressure which can build up inside the pot. Such pressure may be from 5 to 15 pounds per square inch depending on the size of the weight. The valve 8 is a quick release type such as a conventional "Omer" valve which can be raised to release the pressure quickly and which can be turned so as to be held in the open position.

The pressure cooker 3, including the pot 4, the lid 6 and its pressure valves 8 and 26, is conventional and forms no part of the present invention. The use of such pressure cookers for frying chicken is well known in the art. The present invention involves use of a double-pot pressure cooker A having a unique pot extension collar 40 described in more detail below.

The double-pot cooker A employs the conventional pot 4 and the conventional lid 6 plus the unique collar 40. The latter is open at both ends and comprises a slightly tapered side wall 10a with a thickened marginal portion 9a at the lower end and a thickened marginal portion 12a at the upper end. A curved portion 20 connects the side wall portion 10a with the marginal portion 9a and provides a smooth tapered upper surface 28 similar to the upper marginal surface portion of the lid 6.

A handle 5a of the same size as the handle 5 is bolted to or otherwise rigidly connected to the side wall portion 10a. The position of the handle 5a on the wall portion 10a is exactly the same as the position of the handle 5 on the wall portion 10 so that the handles 5a and 7 are in alignment when the collar 40 is locked in the position shown in FIG. 8.

The marginal portion 9a of collar 40 is exactly the same as the marginal portion 9 of the lid 6 and includes the cylindrical flange portion 18, the eight radial flanges 19, the eight cut-away surfaces 20, the marginal slot 21, and the rubber gasket 22 as shown in FIGS. 6 to 9. Likewise the side wall portion 10a of the collar is the same size and shape as the side wall portion 10 of the lid. The thickened portion 12a is exactly the same as the thickened portion 12 and includes the eight radial flanges 13, the eight cut-away surfaces 14, and the tapered upper surface 16.

With this construction, the marginal portion 9a of the collar 40 may be mounted on the conventional pot 4 like the lid 6, and the lid 6 may be mounted on the marginal portion 12a (see FIG. 3). The method of attaching and detaching is apparent from the drawings and is the same as described above in connection with the conventional pressure cooker 3.

When using the single-pot cooker 3 according to the prior art method, a wire basket is usually placed in the pot to hold the chicken or other food being cooked. When using the double-pot cooker A of this invention, a larger wire basket or supporting means is needed. FIGS. 3 and 11 show different ways of supporting the chicken, and it will be apparent that various other means may also be used.

Figure 4:
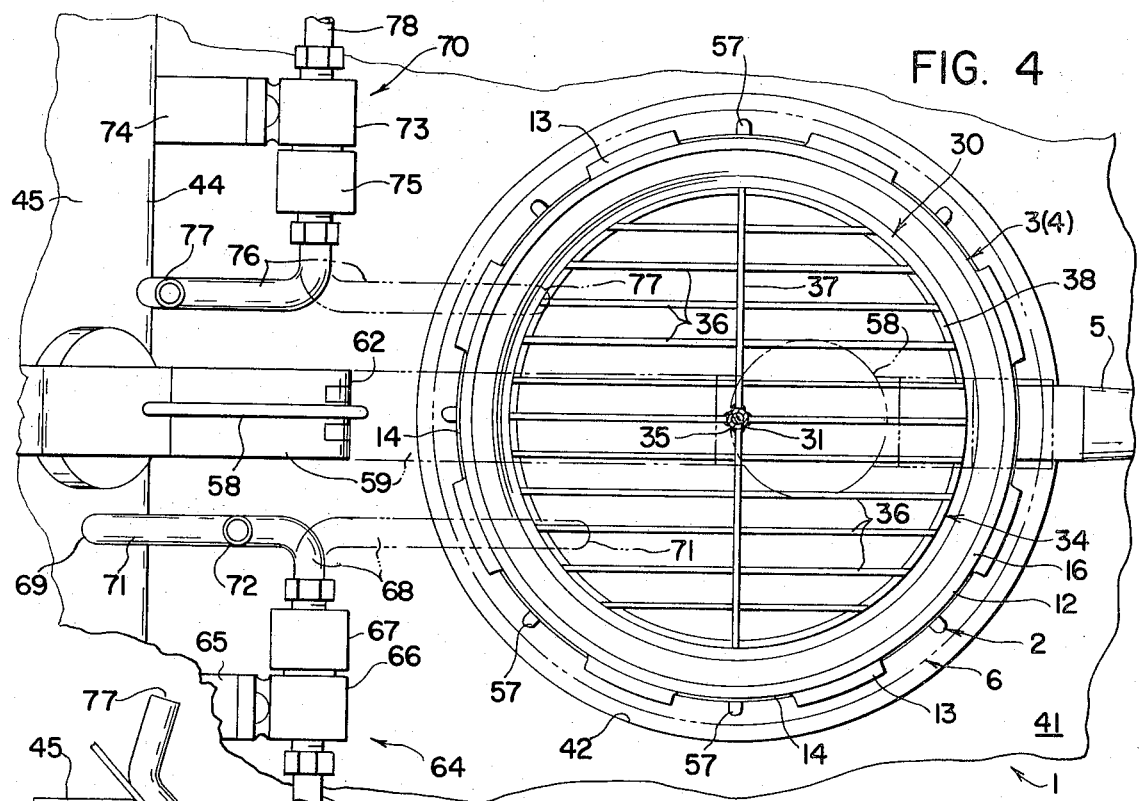
FIG. 4 is a fragmentary top plan view of the apparatus of FIG. 1 showing the lower pot on a burner, the position of the pivoted supply and discharge pipes being shown in dot-dash lines.

In the embodiment of FIG. 3, a wire supporting means 30 is provided comprising a central vertical rod 31 with an integral head 32 at the bottom end and a removable radial cotter pin 33 at the upper end providing a lifting handle. A series of flat circular wire grilles 34 are mounted in horizontal positions at regularly spaced locations along the length of the rod 31. These are spaced apart by tubular metal spacers 35, each spacer preferably being welded to one of the grilles as indicated in FIG. 4. As shown, each grille has parallel wires 36 welded to a circular wire 38, the central wire 36 being welded to the spacer 35. A diagonal wire 37 perpendicular to the wires 36 may be welded to the spacer and to the other wires for added strength.

The unit 30 may be assembled by sliding out the lifting pin 33 and sliding the spacer member 35 of each grille 34 onto the rod 31 until the desired number of grilles are provided on the rod. The uppermost grille 34 is preferably spaced 3 to 5 inches from the top center of the lid 6. If desired, the pieces of chicken may be placed on each grille before it is mounted on the rod 31, but this is optional.

In the embodiment of FIG. 11 an axially elongated cylindrical wire basket 50 is provided having a pair of wire supporting handles 51 located at opposite sides of the basket. The cylindrical basket preferably extends to within 1 to 3 inches of the top center of the lid 6, and the handles project ½ to 1 inch or so about the basket. As herein shown, the handle is carried by a pair of U-shaped wires 52 which extend vertically along the sides of the basket and laterally along the bottom wall of the basket. The wires 52 may be integrally joined and welded to the basket, if desired.

FIGS. 1 and 2 show a portion of a restaurant kitchen constructed to employ the cooking system of the present invention. As shown, the gas range 1 includes a horizontal counter top 41 with a row of circular openings 42 for the burner units 2, a front panel 43 extending downwardly from the counter top to the floor f, a vertical panel 44 extending upwardly from the counter top to the ledge 45, and an end panel 46 extending from the ledge to the floor f and engaging the vertical wall w. A horizontal shelf 47 is provided on the wall to support the pots 4 and rollers 40 when they are not in use, and a horizontal board 48 with a series of supporting hooks 49 is also mounted on the wall to provide supports for the lids 6 when they are not in use (see FIGS. 1 and 2).

A series of timers 53 are mounted on the horizontal ceiling member 56 in positions within reach of the persons operating the equipment, each timer being located above one of the burner units 2 and having a ready light 54, horn and/or other means to signal when the cooking period has ended. A control button 55 or other control means is provided to set the timer at the beginning of the cooking period. The use of the timers is conventional and well understood in the art in connection with the standard pressure cookers 3.

The use of the gas burner units 2 is also conventional, and, therefore, details of this equipment are not shown herein. Each unit has a series of conventional cast iron pot-supporting members 57 with their upper surfaces located generally in a horizontal plane above the counter top 41 for engaging the flat bottom wall 11 of the pot 4. If desired, such upper surfaces may also be shaped to engage a pot with a tapered bottom wall, such as the pot 4a shown in FIG. 10.

A conventional pivoted thermometer may be mounted on the panel 44 to measure the temperature of the hot fat or shortening in the pot 4. As herein shown, a thermometer 58 is mounted on a metal strip 59 which is pivotally supported on a sheet-metal bracket 60 by a hinge 62 having a horizontal pivot pin 61. The thermometer is mounted to swing in the conventional manner from the retracted position shown in solid lines in FIGS. 4 and 5 to a position in the pot 4 as shown in dot-dash lines in those figures.

Figure 5:
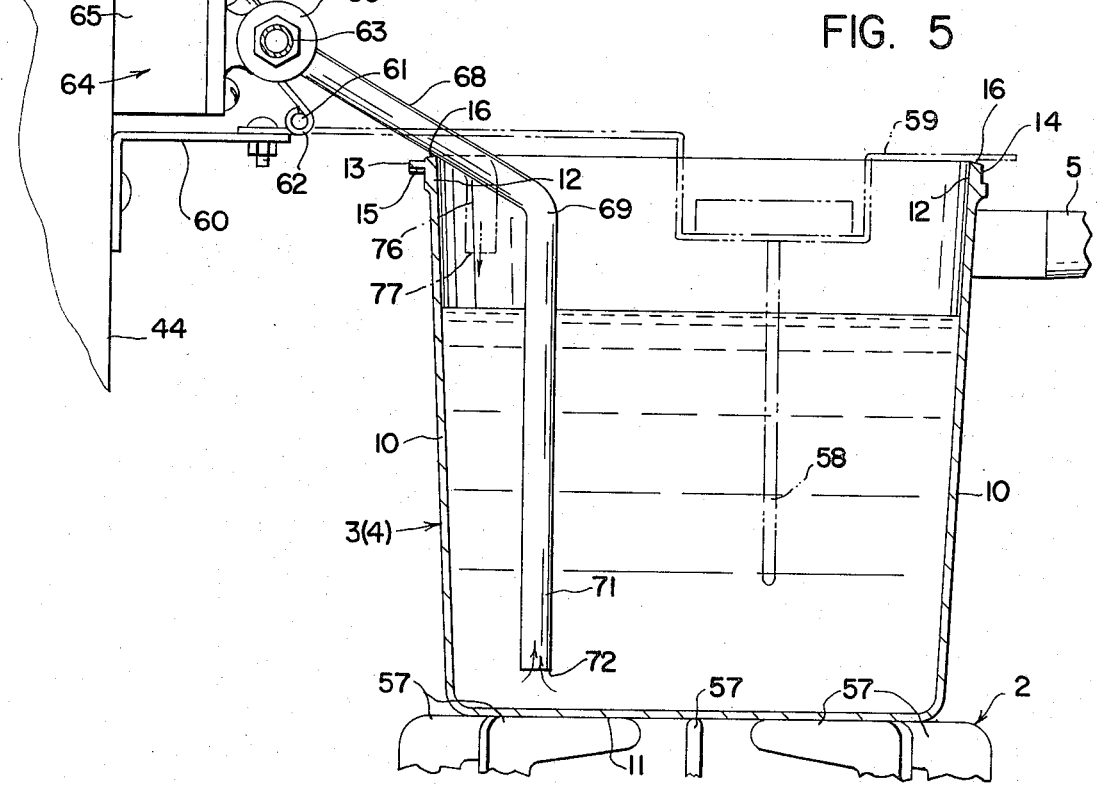
FIG. 5 is a fragmentary side elevational view of the apparatus of FIG. 4, the discharge pipe or siphon being shown in the operating position, the thermometer and the supply pipe being shown in dot-dash lines in their operating positions.

In accordance with the present invention, means are provided for removing the hot fat or shortening from the lower pot 4 at the end of the cooking period. This may be done by pumping or siphoning the hot fat from the pot or by draining it out as shown in FIG. 10. As shown in FIGS. 1 to 5, pivoted means are provided for removing the hot fat through a discharge pipe 63 at the rear of each burner unit 2. Each discharge unit 64 is supported on the panel 44 by a mounting member 65 having a cylindrical portion 66 which receives the inlet end of the discharge pipe 63. A similar hollow cylindrical member 67 is rotatably mounted on the portion 66 coaxial therewith and receives the discharge end of a curved siphon pipe 68. The latter has a bend 69 and a straight portion 71 which is substantially vertical when the pipe 68 is lowered into the pot as shown in FIG. 5. The open lower end 72 of the pipe may thus be positioned at or near the bottom wall 11 of the pot (for example, within ¼ or ½ inch of the bottom) to remove substantially all of the hot fat from the pot. The pipe 68 is rigidly connected to the member 67 to turn in unison therewith, the latter being rotatable on the member 66 and in sealing engagement therewith so that the hot liquid will flow from pipe 68 to discharge pipe 63 without leakage. The members 66 and 67 provide a conventional rotating pipe fitting.

A similar rotating pipe fitting is provided on each of the supply units 70 including a stationary cylindrical member 73 carried by the wall support member 74 and a coaxial rotating cylindrical member 75. A curved supply pipe 76 is rigidly mounted on the member 75 to swing in unison therewith from the retracted position shown in solid lines in FIGS. 4 and 5 to the operating position shown in dot-dash lines in those figures. The discharge end 77 of the pipe 76 may be located a short distance above the upper level of the hot liquid in the pot during filling to avoid the danger of accidental siphoning, but this is not essential. The discharge end of the stationary supply line 78 is connected to the member 73 so that the hot liquid may be pumped from line 78 through the sealed fitting 73-75 to the swinging supply pipe 76.

As shown in FIG. 1, one discharge unit 64 and one supply unit 70 are located above each burner unit 2 so that the swinging pipes 68 and 76 and the thermometer 58 may all be positioned in one pot 4 at the same time. When they are retracted, their weight holds them against the edge of ledge 45 where they are out of the way of the pots being heated.

Manual shut-off valves 79 and 80 are provided in the lines 63 and 78, respectively, to control the flow of the hot liquid from or to the pots 4.

FIG. 12 is a diagrammatic view showing one form of hydraulic system which may be employed in the practice of the present invention. A reservoir 81 receives the hot fat or liquid and delivers it through a conventional filter 82 to a reservoir 83 at the same or a lower elevation. A pump 84 is provided in the discharge line 87 leading from the branch pipes 63 and delivers the liquid to the reservoir 81 through the pipe 88. Another pump 85 is provided to remove the liquid from the reservoir 81 through the siphon pipe 89, the filter 82, and the pipe 90 to the reservoir 83. A third pump 86 is provided to draw the liquid from the latter reservoir through the pipes 91 and 92 to the branch supply pipes 78.

The pumps 84, 85 and 86 may be operated when pressure is required or may be operated continuously to maintain a suction in the main discharge line 87 and to maintain pressure in the main supply line 92. In such case, the valves 79 and 80 are maintained fully closed and are opened only for brief periods sufficient to empty or fill the pot or pots 4. If desired, the valves 79 and 80 may be closed in response to retraction of the associated pipes 68 and 76 and automatically opened when such pipes are swung into the pot 4.

The two reservoirs 81 and 83 may, if desired, be conventional Frymaster units having means for heating and/or filtering the hot liquid, but it is not necessary to employ such expensive equipment. Where heating means are provided in connection with the reservoirs, it is desirable to control the temperature in the reservoir 83 and to maintain the temperature 15° to 50° higher than in the reservoir 81. For example, the temperature in reservoir 83 can be maintained in the range of 270° to 370°F. If the reservoirs are open to atmosphere, it may be preferable to limit the temperatures to a maximum of 300° to 320°F. for safety reasons.

The process of the present invention may be carried out, for example, with a 21-quart pressure cooker 3 and a pot extension collar 40 providing a double-pot cooker A with a capacity greater than 40 quarts. In a typical process according to this invention, the lower pot 4 is placed on the burner unit 2 and filled to a depth of 8 inches or so with hot fat or shortening at a relatively high temperature of perhaps 250° to 300°F. or higher. The hot liquid may be introduced entirely or in part by use of the supply pipe 76 or may be introduced manually by a ladle. The thermometer 58 is swung into the hot liquid and the gas burner is turned on to heat the liquid to the desired temperature, such as 370° to 430°F. When the proper temperature is reached, the thermometer is retracted and the collar 40 is then mounted in liquid-tight sealing engagement with the pot 4 as shown in FIG. 3 to form a double-pot cooker A larger enough for six average-size chickens.

The wire basket 50 of FIG. 11 or other chicken-supporting means, such as the wire grilles 34 of FIG. 3, is then lowered into the double pot together with chicken weighing in the neighborhood of 14 pounds. The total volume of the various pieces of chicken c is such that the level of the hot liquid is raised from about 8 inches to perhaps 12 to 18 inches. The lid 6 is then mounted on the top of the collar 40 to seal the pot, and heat from the gas burner causes the pressure in the double-pot A to increase. After a suitable cooking period of 8 to 12 minutes, which may be inversely related to the cooking temperature, and after the pressure in the pot A is in the range of 5 to 15 pounds per square inch, the burner is shut off, the valve 8 is opened to release the pressure quickly, and the lid 6 is removed.

The timing of the frying operation is important, and it is, therefore, preferable to employ the timer 53. Thus, when the chicken is dropped into the pot A, the control switch at 55 is operated to start timing. This can turn on a white light (not shown) to indicate cooking. At the end of the desired cooking period (for example 8 to 12 minutes), the timer turns off the white light, turns on a red light and sounds a buzzer or other alarm to indicate the end of the cooking cycle. The timer may also turn off the burner automatically at this time, but this is not essential.

When the red light and buzzer come on to signal the end of the cooking cycle, the chicken is removed from the pot A as indicated above so that the level of the hot liquid drops to about 8 inches. At this time the liquid temperature may be below 300°F. The collar 40 is then removed from the pot 4 while the pot remains on the burner member 57. The collar may then be cleaned with a spatula or heat-resistant rubber or other suitable cleaning device to remove cracklings or deposits on the wall 10a.

All or most of the hot liquid remaining in the pot 4 is then siphoned off or removed by use of the pivoted siphon pipe 68 or other suitable pumping or siphon means, by pouring or draining off the hot liquid, or by use of a ladle. After the liquid level is reduced to less than 5 inches, it is relatively easy to lift the pot 4 and to pour out any remaining liquid. This removes the cracklings or carbon particles from the pot so that they will not contaminate the next batch of chicken to be cooked.

All of the hot liquid may be returned to the reservoir 81 through the siphon pipe 68 or by the ladling or pouring operation. When the pipe 68 is used, the associated valve 79 is opened for a brief period no greater than necessary to lower the liquid level in the pot to the desired height (for example, 1 or 2 inches). The pipe 68 preferably does not touch the bottom wall 11 so that it will not receive all of the cracklings. This leaves some liquid in the pot 4 to be poured out and returned to the reservoir 81. Such pouring may not be necessary when using a drain of the type shown in FIG. 10.

The hot liquid flowing from the reservoir 81 is filtered so that it is clean when it arrives in the reservoir 83 and when it is delivered to another pot 4 for a subsequent cooking cycle. The pot 4 and the collar 40 are also substantially clean when they receive the clean liquid. If a ladle is used to fill the pot 4, the temperature of the hot fat or liquid may be 320°F. or less, but a higher temperature is permissible when the liquid is supplied to the pot 4 through the pivoted supply pipe 76. The temperature of the liquid discharged from pipe 76 may be in the range of 300° to 400°F. or somewhat higher when the liquid is heated as it flows from the reservoir. The hot liquid may, if desired, be used to assist in cleaning the pot 4 or 40 at the end of the cooling period.

During slack periods, use of the collars 40 is, of course, unnecessary. In that case the usual cooking procedure would be employed using half as much of the liquid. At the end of the cooking period, more care would be required in cleaning the pot 4 because there would be a ring of deposits on the wall 10.

One method of eliminating such a ring on wall 10 or 10a is to provide a floating sleeve of short axial length or a longer stationary sleeve which can be removed for cleaning.

Cleaning can be effected in various ways using rotating brushes or other mechanical cleaning devices instead of the rubber spatula. However, the spatula is effective and efficient.

The pressure cooker may be specially shaped to facilitate cleaning or emptying. For example, the pot may have a drain opening or a pouring spout to facilitate safe removal of the hot liquid. Also the collar 40 may have its diameter reduced near the top or throughout its length to raise the liquid level.

FIG. 10 illustrates one special form of pressure cooker having a pot 4a with a wall 10 and flanges 12 and 13 and all other elements at the top of the wall the same as the pot 4 but having a special tapered bottom wall 11a with a central circular drain opening 93. A drain pipe 68a is detachably connected to the pot 4a at 93 and carries the hot liquid from the pot to the discharge pipe 63 of a hydraulic system of the type shown in FIG. 12. The pipe 68a may be made readily removable to facilitate periodic cleaning.

The bottom wall 11 may be tapered or funnel-shaped to facilitate cleaning, but it may be flat, particularly where the discharge opening 93 has a diameter of 2 inches or more, becuase it can easily be cleaned with a rubber spatula without moving the pot 4a. The latter may be rigidly mounted, if desired.

The pots 4a may be employed in place of the pots 4 in the system shown in FIG. 12 by omitting the pivoted pipes 68 and replacing the valves 79 with suitable valves 79a. The latter cut off the flow from the pot 4a to the associated pipe 63 of FIG. 12 and may be located adjacent the bottom walls 11a to minimize the amount of liquid in the pipe 68a.

When using the pots 4a in the hydraulic system of FIG. 12, the pivoted thermometer 58, the pivoted supply pipes 76, and the valves 80 are used in the same way as with the pots 4 to effect filling of the pots. Heating of the pots is also effected in the same way by the burner units 2, the pipe 63 being located at the center of the conventional burner ring where it is not damaged by the heat. At the end of the cooking period, it would be easier to removed the hot liquid from the pot 4a than it would with the pot 4 because all that is necessary is to open the valve 79a and allow the liquid to drain out. The hot liquid flows very readily so that cleaning of the pot 4a is no problem. When using the pots 4a gravity flow can be employed so that the pump 84 may be omitted or may be of a smaller size. Also the valve 79a may be opened while the pressure in the pot 4a is substantial (e.g., at least 2 or 3 pounds per square inch). For example, if such valve is opened while the pressure is 5 to 10 pounds per square inch, the hot liquid will flow rapidly from the pot 4a to the reservoir 81 even if the pump 84 is omitted.

It will be apparent that the specific equipment shown in the drawings of this invention may be changed in various ways while still performing similar functions. For example, the pressure cooker can be provided with built-in thermometers or timers to eliminate the need for the pivoted thermometers or the overhead timers shown herein. It will also be understood that the equipment can be further automated to eliminate some of the manual operations and to speed up the process. However, manual operation is often preferable in small kitchens to minimize the cost of the equipment.

The hydraulic system shown in FIG. 12 is merely given for process of illustration, it being understood that the piping arrangements may vary considerably and that various arrangements are suitable for supplying and removing the hot liquid. For example, the pumping means 84, 85 and 86 may be replaced with various other pumping arrangements. Also the motors for the pumps 84, 85 and 86 may be automatically controlled or operated intermittently or only when needed instead of being operated continuously.

It will also be understood that the cooking process may be modified or improved in various ways. For example, by changing the type of batter or coating material in which the chicken is dipped prior to cooking. It will also be understood that the process may be used to fry foods other than chicken.

In accordance with the provisions of the patent laws, variations and modifications of the specific devices disclosed herein may be made without departing from the spirit of the invention.

Having described my invention I claim:

1. Apparatus for frying chicken comprising a cooking range having a series of heating units with a series of pressure cookers mounted thereon, each pressure cooker comprising a lower pot with a volume of at least 15 quarts, a pot extension collar providing an additional volume of at least 10 quarts, and a lid having sealing means for engaging said collar to prevent leakage between the upper portion of said collar and the marginal portion of said lid, quick-release valve means in said lid for controlling the escape of gas from the pressure cooker to provide a pressure in the range of about 5 to about 15 pounds per square inch, releasable locking means at the marginal portion of said lid and the upper marginal portion of said collar for clamping the lid in sealing engagement with the collar in response to turning of the lid relative to said collar, handle means on said lid and said collar to effect such relative turning to lock and release the lid, sealing mans at the lower marginal portion of said collar for engaging the upper marginal portion of said lower pot to prevent leakage of hot liquid between the lower pot and the collar, and releasable locking means at the lower marginal portion of said collar and the upper marginal portion of said lower pot for clamping the collar in sealing engagement with the lower pot in response to turning of the collar relative to said lower pot; means for removing the hot liquid from the lower pots of said pressure cookers after the fried chicken is removed from the pots, means for filtering the hot liquid removed from said pots, a reservoir for the hot liquid, means for delivering the filtered liquid to said reservoir, and means for supplying heated filtered liquid from said reservoir to the individual lower pots.

2. Frying apparatus as defined in claim 1 wherein the means for removing the hot liquid comprises a series of siphon pipes mounted to move from retracted positions away from said pressure cookers to operating positions in said lower pots.

3. Frying apparatus as defined in claim 1 wherein the means for removing the hot liquid comprises a series of pivoted discharge pipes, each discharge pipe being mounted near each heating unit to swing from a retracted position away from the pressure cooker on said heating unit to an operating position wherein the inlet end of the pipe is spaced no more than 3 inches from the bottom of the lower pot.

4. Frying apparatus as defined in claim 3 wherein the means for supplying liquid to the lower pots comprises a series of pivoted supply pipes, each supply pipe being mounted near one of the heating units to swing from a retracted position away from the associated pressure cooker to an operating position wherein hot liquid from said reservoir is discharged into the lower pot of said pressure cooker.

5. Frying apparatus as defined in claim 4 wherein motor-driven pump means are provided for delivering hot liquid from said reservoir to said supply pipes, for removing the liquid from said discharge pipes, and for moving the liquid through said filtering means to said reservoir.

6. Frying apparatus as defined in claim 5 wherein each of said lower pots has a volume of about 15 to about 30 quarts, each of said collars provides an additional volume of about 15 to about 30 quarts, and each of said lids can be mounted on the lower pot to provide a conventional pressure cooker.

7. Apparatus as defined in claim 6 wherein said cooking range contains 5 to 20 heating units and there are provided near each heating unit an independent temperature indicating means and an independent timer means for the pressure cooker of that heating unit.

8. Apparatus as defined in claim 1 wherein each lower pot has a drain opening and valve means for opening and closing said opening.

9. Apparatus as defined in claim 8 wherein pipe means are provided to deliver the hot liquid from each drain opening to said reservoir.

* * * * *